United States Patent [19]

Savolainen et al.

[11] Patent Number: 4,636,181
[45] Date of Patent: Jan. 13, 1987

[54] CONVEYOR CHAIN

[75] Inventors: Esko Savolainen, Soramäki; Tuomo Laukkarinen, Ruohio; Arto Lehto, Espoo; Erkki Oksman, Helsinki; Unto Eilamo, Lahti, all of Finland

[73] Assignee: Oy Nokia Ab, Helsinki, Finland

[21] Appl. No.: 743,992

[22] PCT Filed: Oct. 10, 1984

[86] PCT No.: PCT/FI84/00073
§ 371 Date: Jun. 6, 1985
§ 102(e) Date: Jun. 6, 1985

[87] PCT Pub. No.: WO85/01783
PCT Pub. Date: Apr. 25, 1985

[30] Foreign Application Priority Data

Oct. 11, 1983 [FI] Finland .................................. 833694

[51] Int. Cl.$^4$ .............................................. F16G 13/02
[52] U.S. Cl. .................................... 474/207; 474/206; 198/850
[58] Field of Search ................... 474/206, 207; 59/78, 59/84, 85; 198/850, 851, 853

[56] References Cited

U.S. PATENT DOCUMENTS 3,127,980  4/1964  Lanham ......................... 474/207 X
3,138,236  6/1964  Goodgame ........................ 198/850
4,123,947  11/1978  Smith et al. ........................ 59/9 X Primary Examiner—James A. Leppink
Assistant Examiner—Frank H. McKenzie, Jr.
Attorney, Agent, or Firm—Scully, Scott, Murphy & Presser

[57] ABSTRACT

The invention relates to a conveyor chain, which comprises chain links (1) consisting of a barrel portion (2) and elongated side bars (3,4), the first ends of which are attached to the ends of the barrel, whereby the distance between the free ends of the side bars (3,4) corresponds to the length of the barrel (2) including the side bars attached to it. In order to enable the assembly of a chain of identical, mutually similar parts without tools, the surfaces located opposite each other at the free ends of the bars (3,4) of the chain links are provided with studs (5,6), the outer diameter of which corresponds to the inner diameter of the barrel (2) and the elasticity of the bar (3,4) material is such that the bars can be spread from each other to such an extent as to enable the insertion of the studs (5,6) of one chain link into the barrel (2) of another chain link.

6 Claims, 6 Drawing Figures

CONVEYOR CHAIN

BACKGROUND OF THE INVENTION

The invention relates to a conveyor chain, which comprises chain links consisting of a barrel portion and of elongated side bars, the first ends of which are attached to the ends of the barrel, whereby the distance between the free ends of the side bars corresponds to the length of the barrel including the side bars attached to it.

From the U.S. Pat. No. 4,123,947 a conveyor chain described above is known. This prior art chain consists of chain links made of acetal and of locking studs made of a polymer with a glass fibre reinforcement. The fastening of the locking studs in place is based upon the elasticity of the material of the chain links and locking studs so that a ring-shaped slot in the studs is forced into alignment with a ring-shaped ridge of a corresponding size in the links. To assemble the stud demands, however, quite considerable forces, so that a press designed especially for this purpose is required for the assembly. Moreover, the locking studs and chain links are manufactured separately, so that a separate mould is needed for the manufacture of each of them.

SUMMARY OF THE INVENTION

The present invention is meant to eliminate the problems relating to the construction described above, i.e. to eliminate the need for a special assembly tool and two separate moulds. This has been realized by means of a conveyor chain according to the invention so that the surfaces located opposite each other at the free ends of the bars of the chain links are provided with studs, the outer diameter of which corresponds to the inner diameter of the barrel, and that the elasticity of the bar material is such that the bars can be spread from each other to such an extent as to enable the insertion of the studs of one chain link into the barrel of another chain link.

Consequently, a chain according to the invention can be assembled and disassembled by hand without any special strength or experience being damanded from the one who is carrying out this task. In order to make sure that the chain links hold fast to each other while the chain is used, the inner surface of the barrel of the chain links as well as the studs are provided with parts which permit the insertion of the studs only in a certain mutual position of the links and lock the studs in all other positions inside the barrel. The parts mentioned preferably comprise shoulders formed on the inner surface of the barrel and ring-shaped slots formed on the studs as well as axial grooves terminating at the slot and having a breadth corresponding to the shoulders.

BRIEF DESCRIPTION OF THE DRAWINGS

In the following, the construction of the chain according to the invention is described more closely with reference to the enclosed drawing, wherein.

DETAILED DESCRIPTION OF THE PREFERRED EMBODIMENTS

Figure 1:
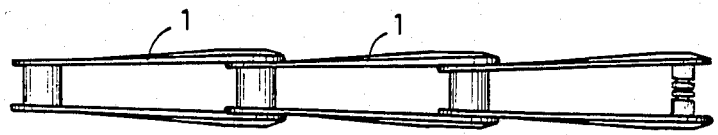
FIG. 1 illustrates an assembled chain of the invention.

FIG. 1 illustrates a chain of the invention consisting of chain links 1 especially suitable to be manufactured of acetal or high molecular polyethylene. A non-metallic conveyor chain of the invention is particularly well adapted for use in moist environments and in water and even in a water-sand-suspension its wear resistance is considerably better than that of steel chains. On account of the lightness of the chain, the motors and gearings needed for moving the chain can also be dimensioned essentially smaller than usual.

A special advantage of the chain according to the invention is that it consists of only identical pieces. The results are low manufacturing costs, because only one mould is needed, and low spare part costs.

Figure 2:
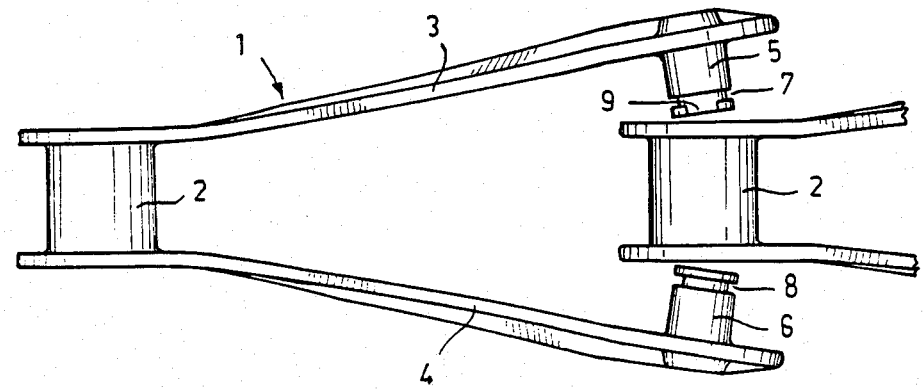
FIG. 2 illustrates the assembly principle of the chain.

FIG. 2 shows how the chain of the invention is extended. The chain link of FIG. 2 consists of a barrel portion 2 and elongated side bars 3 and 4, the first ends of which are attached to the ends of the barrel 2. Stud portions 5 and 6 with a round cross-section and located opposite each other are fastened to the free ends of the side bars 3 and 4. The diameter of the stud portions 5 and 6 corresponds to the diameter of the inner boring of the barrel. To some extent, the length of the studs can be chosen, but preferably it is identical with the distance between the side bars thus creating the greatest possible bearing area between successive links. On account of the elasticity of the material of the side bars, they can easily be spread from each other to such an extent as to enable the insertion of the stud portions 5 and 6 into the barrel of the following link.

Figure 3:
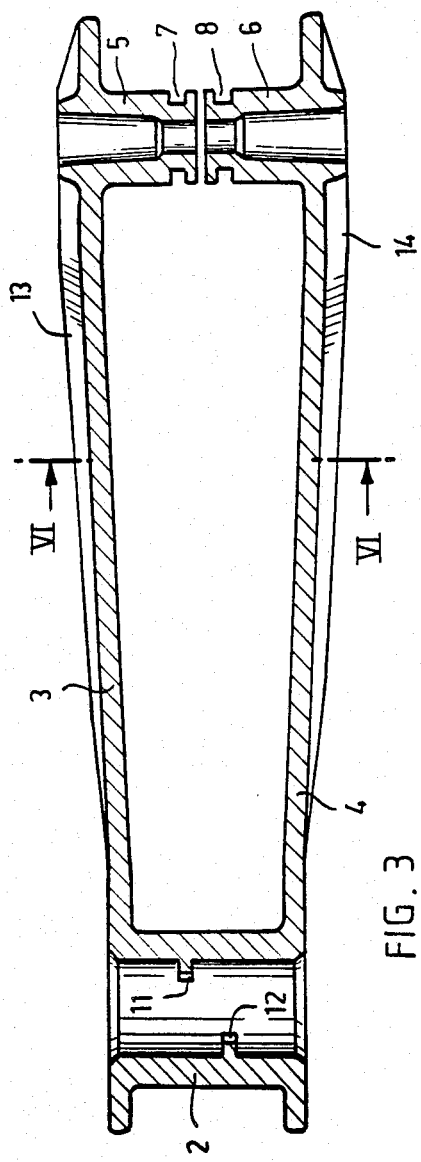
FIG. 3 is a cross-section of the chain link of the chain according to the invention.

FIG. 3 shows a section of a chain link of the invention. As it appears from the Figures, the studs 5 and 6 are provided with through holes, where various parts can be fastened to the chain by means of through bolts. To make sure that the studs 5 and 6 are locked inside the barrel 2, they are provided with ring-shaped slots 7 and 8 and axial grooves 9 and 10 extending from the stud ends to these slots. In the embodiment of the Figures, the grooves 9 and 10 are located diametrically opposite each other. The inner surface of the barrel 2 again is provided with likewise diametrically opposite located shoulders 11 and 12. Consequently, the studs can be inserted into the barrel only when the grooves 9 and 10 are aligned with the shoulders 11 and 12 of the barrels. This is possible in the embodiment described, when the successive chain links form an angle of appr. 90°. Thus, the links can also be separated from each other only at the angle mentioned. In other positions, the shoulders 11 and 12 are situated in the slots 7 and 8 of the studs 5 and 6, whereby the studs are locked inside the barrel and thus also the links to each other. It shall be mentioned that the angle in question, whereat the links can be combined and separated, can well be some other than the mentioned angle of 90° and it is also possible to arrange so that one of the side bars is locked inside the barrel at another angle than the other side bar.

Figure 5:
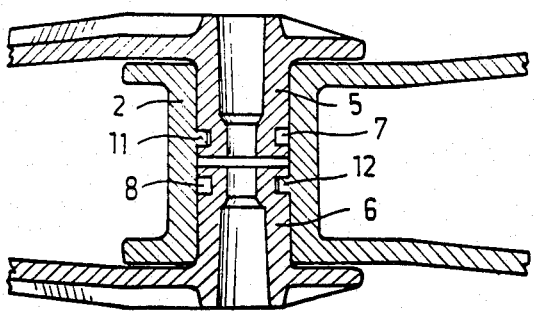
FIG. 5 is a section of the juncture between the chain links.
Figure 6:
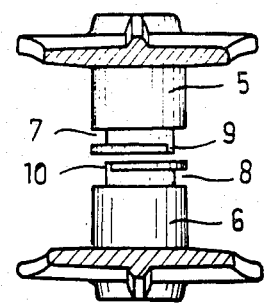
FIG. 6 is a section of the chain link of FIG. 3 along the line VI-VI.

FIG. 5 shows the situation described above, wherein two links are locked to each other. Then the shoulders 11 and 12 of the barrel, which are preferably sector-shaped, are situated in the slots 7 and 8. The diametrical location of the grooves of the studs 5 and 6 is seen from FIG. 6.

Figure 4:
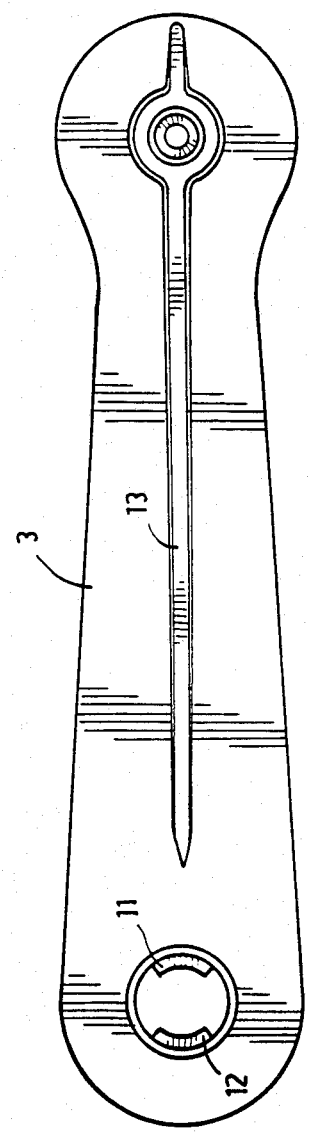
FIG. 4 is a side view of the chain link.

As it is seen especially from the FIGS. 3 and 4, the side bars 3 and 4 are provided with ribbings 13 and 14, which, however, terminate a little before the barrel 2. In this way, the side bars 3 and 4 can be made to bend along a distance long enough. This is to inhibit an application of a force that would exceed the elasticity of the side bars to a small area of the side bars.

The drawings and the explanation attached to it are only meant to visualize the idea of the invention. As to the details, the chain links of the chain of the invention can vary even considerably within the limits of the attached claims.

We claim:

1. A conveyor chain comprising a plurality of adjacent chain links, each chain link including:
   a barrel portion including an inside cylindrical surface having an inside diameter, and first and second spaced apart shoulders extending radially inward from said inside surface;
   first and second generally parallel, elongated side arms, each side arm having a first end connected to and extending away from the barrel portion;
   a first cylindrical stud extending inward from a second end of the first side arm, having an outside diameter approximately equal to the inside diameter of the barrel portion, and including
   (i) a first circumferential recess extending radially inward from an outside surface of the first stud, to receive and hold the first shoulder of the barrel portion of an adjacent chain link, and
   (ii) a first axial groove extending inward from the outside surface of the first stud, and extending away from the first circumferential recess along the axis of the first stud, to facilitate sliding the first shoulder of the barrel portion of the adjacent chain link into the first circumferential recess;
   a second cylindrical stud extending inward from a second end of the second side arm, having an outside diameter approximately equal to the inside diameter of the barrel portion, and including,
   (i) a second circumferential recess extending radially inward from an outside surface of the second stud, to receive and to hold the second shoulder of the barrel portion of the adjacent chain link, and
   (ii) a second axial groove extending inward from the outside surface of the second stud, and extending away from the second circumferential recess along the axis of the second stud, to facilitate sliding the second shoulder of the barrel of the adjacent chain link into the second circumferential recess.

2. A conveyor chain according to claim 1, wherein:
   the side arms of each chain link extend along and define a link axis;
   first and second adjacent chain links have a locked position wherein the first and second studs of the first chain link are securely held in the barrel portion of the second chain link, and an unlocked position wherein the first and second studs of the chain link are moveable into and out of the barrel position of the second chain link; and
   when the first and second chain links are in the unlocked position, the link axes of the first and second links form a fixed, preset angle.

3. A conveyor chain according to claim 2, wherein:
   when the first and second adjacent chain links are in the locked position, the first and second shoulders of the first chain link are respectively locked in the first and second circumferential recesses of the second chain link; and
   when the first and second adjacent chain links are in the unlocked position, the first and second shoulders of the first chain link are respectively aligned with the first and second axial recesses of the second chain link.

4. A conveyor chain according to claim 2, wherein:
   when the first and second adjacent chain links are in the locked position, the first and second shoulders of the first chain link are respectively locked in the first and second circumferential recess of the second chain link; and
   when the first and second adjacent chain links are in the unlocked position, the first and second shoulders of the first chain link are respectively aligned with the first and second axial recesses of the second chain link.

5. A conveyor chain comprising a plurality of adjacent chain links, each chain link including:
   a barrel portion including an inside cylindrical surface defining a barrel axis;
   first and second generally parallel, elongated side arms, each side arm having a first end connected to an extending away from the barrel portion;
   a first cylindrical stud extending inward from a second end of the first side arm, and including
   (i) an outside surface having a diameter approximately equal to the inside diameter of the barrel portion, and (ii) a first shoulder extending radially outward from the outside surface; and
   a second cylindrical stud extending inwward from a second end of the second side arm, and including
   (i) an outside surface having a diameter approximately equal to the inside diameter of the barrel portion, and
   (ii) a second shoulder extending radially outward from the outside surface of the second stud;
   the barrel further including,
   (i) a first circumferential recess radially extending outward from the inside surface of the barrel, to receive and hold the first shoulder of an adjacent chain link,
   (ii) a first axial groove extending outward from the inside surface of the barrel, and extending away from the first circumferential recess along the axis of the barrel, to facilitate sliding the first shoulder of the adjacent chain link into the first circumferential recess,
   (iii) a second circumferential recess radially extending outward from the inside surface of the barrel, to receive and to hold the second shoulder of the adjacent chain link, and
   (iv) a second axial groove extending outward from the inside surface of the barrel, and extending away from the second circumferential recess along the axis of the barrel, to facilitate sliding the second shoulder of the adjacent chain link into the second circumferential recess.

6. A conveyor chain according to claim 5, wherein:
   first and second adjacent chain link extend along and define a link axis;
   first and second adjacent chain links have a locked position wherein the first and second studs of the first chain link are securely held in the barrel of the second chain link, and an unlocked position wherein the first and second studs of the first chain are moveable into and out of the barrel of the second chain link; and
   when the first and second chain links are in the unlocked position, the link axes of the first and second links form a fixed, preset angle.

* * * * *